(No Model.)

O. P. BRINKER.
ATTACHMENT FOR CORN PLANTERS.

No. 490,266. Patented Jan. 24, 1893.

Witnesses
B. S. Ober
O. E. Dyfe

Inventor
O. P. Brinker;
By his Attorneys,
C. A. Snow & Co.

THE NORRIS PETERS CO., PHOTO-LITHO., WASHINGTON, D. C.

UNITED STATES PATENT OFFICE.

OLIVER P. BRINKER, OF ASHVILLE, OHIO.

ATTACHMENT FOR CORN-PLANTERS.

SPECIFICATION forming part of Letters Patent No. 490,266, dated January 24, 1893.

Application filed July 12, 1892. Serial No. 439,784. (No model.)

*To all whom it may concern:*

Be it known that I, OLIVER P. BRINKER, a citizen of the United States, residing at Ashville, in the county of Pickaway and State of Ohio, have invented a new and useful Attachment for Corn and Seed Planters, of which the following is a specification.

My invention relates to improvements in corn and seed planters and refers particularly to an attachment to be applied to the shoe, the object of my improvement being to prevent the jumping and straining occasioned by coming in contact with clods, roots, stones, &c.

My attachment consists, essentially, in fenders, or mold-boards, adjustably attached to the shoe, or to the runner or blade, and extending in rear of the heel of the shoe, said fenders or mold-boards being deflected or diverged toward their rear ends to clear the way for the shoe, the covering wings being carried by said fenders or mold-boards in a favorable position to cover the grain after it reaches the furrow.

My invention consists, furthermore, in certain details of construction which will be fully described hereinafter in connection with the drawings, the novel features thereof being pointed out in the appended claim.

Figure 1:
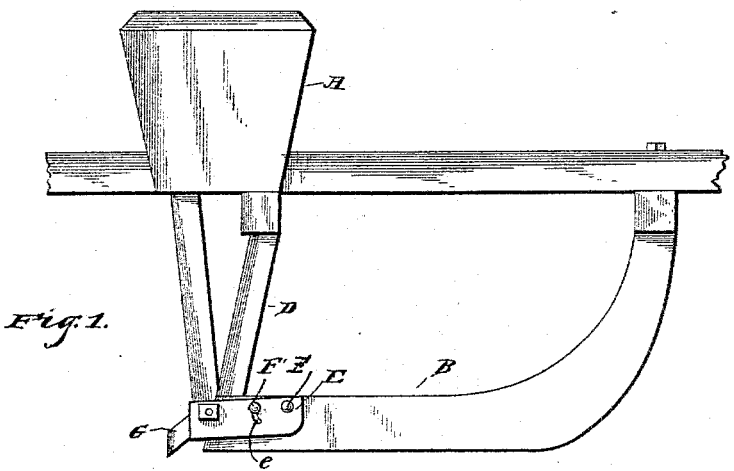
Figure 2:
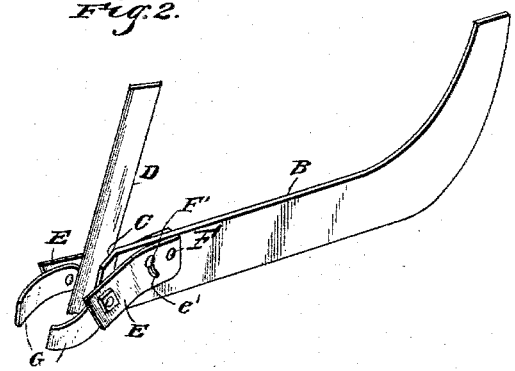
Figure 3:
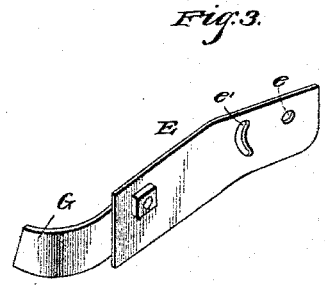

In the drawings, Figure 1 is a side view of a portion of the front end of a corn planter, with my attachment applied in the operative position; Fig. 2 is a perspective view of the shoe, and the attachments, detached from the machine, and looking at the rear thereof; Fig. 3 is a detail view of one of the fenders, detached.

A represents the ordinary hopper, B the forwardly extending runner or blade, resting at its lower edge upon the ground and adapted to cut thereinto to open the way for the shoe, and C represents the shoe attached to the rear end of the runner or blade, said shoe and the rear end of the runner or blade being supported by the vertical standard, D. To the opposite sides of the runner or blade, immediately in front of the shoe, (and extending at their rear ends beyond the rear end or heel of the shoe) are attached the front ends of the fenders or mold-boards, E E, by the through-bolts F. F'. The bolt F takes in registering perforations e e in the fenders and in the runner or blade, and the bolt F' takes in a perforation in the runner or blade, and vertical slots, e' e', in the fenders, whereby the rear ends of the latter may be elevated or depressed, (and locked in their adjusted positions,) in order to regulate the depth of the furrow.

G G represent rearwardly convergent covering wings which are bolted to the inner surfaces of the fenders and incline downwardly and are tapered toward their extremities to touch the ground just in rear of the heel of the shoe, as shown in Fig. 2. The fenders are curved outwardly or diverged toward their rear ends, and, being arranged upon both sides of the shoe, it will be apparent that clods, which are not broken or crushed, and roots, stones, &c., will be pushed aside and prevented from coming in contact with the shoe, and therefore the regular operation of the latter is preserved.

Having thus described my invention, what I claim and desire to secure by Letters Patent of the United States, is:—

The combination with a shoe, of fenders E arranged upon opposite sides of the shoe, pivoted thereto at their front ends by means of a common fixed pivot, and provided near their pivoted ends with curved guide-slots e', fixed adjusting bolts projecting outwardly from the shoe and passing through said slots, angularly adjustable covering wings G pivotally bolted to the inner surfaces of the fenders near their rear ends and curved inward and inclined downward toward their rear ends and having beveled terminals, substantially as specified.

In testimony that I claim the foregoing as my own I have hereto affixed my signature in the presence of two witnesses.

OLIVER P. BRINKER.

Witnesses:
D. F. WEAVER,
M. P. BRINKER.